US011663928B2

(12) United States Patent
Ferry et al.

(10) Patent No.: US 11,663,928 B2
(45) Date of Patent: May 30, 2023

(54) METHOD AND DEVICES FOR ON-DEMAND ROLE PLAYING

(71) Applicants: Thomas Ferry, Santa Ana, CA (US); David Shanks, Santa Ana, CA (US); Raymond Jones, Santa Ana, CA (US)

(72) Inventors: Thomas Ferry, Santa Ana, CA (US); David Shanks, Santa Ana, CA (US); Raymond Jones, Santa Ana, CA (US)

( * ) Notice: Subject to any disclaimer, the term of this patent is extended or adjusted under 35 U.S.C. 154(b) by 174 days.

(21) Appl. No.: 17/077,555

(22) Filed: Oct. 22, 2020

(65) Prior Publication Data

US 2022/0130278 A1 Apr. 28, 2022

(51) Int. Cl.
| | |
|---|---|
| *G09B 19/04* | (2006.01) |
| *G09B 5/02* | (2006.01) |
| *G10L 25/90* | (2013.01) |
| *G10L 17/00* | (2013.01) |
| *G10L 25/63* | (2013.01) |
| *G06Q 50/00* | (2012.01) |
| *G06N 5/02* | (2023.01) |
| *G06V 10/40* | (2022.01) |
| *G06V 20/40* | (2022.01) |
| *G06V 40/20* | (2022.01) |
| *G06Q 50/16* | (2012.01) |
| *G06Q 10/10* | (2023.01) |
| *G06V 30/10* | (2022.01) |

(52) U.S. Cl.
CPC .............. *G09B 19/04* (2013.01); *G06N 5/02* (2013.01); *G06Q 50/01* (2013.01); *G06V 10/40* (2022.01); *G06V 20/41* (2022.01); *G06V 40/28* (2022.01); *G09B 5/02* (2013.01); *G10L 17/00* (2013.01); *G10L 25/63* (2013.01); *G10L 25/90* (2013.01); *G06Q 10/10* (2013.01); *G06Q 50/16* (2013.01); *G06V 30/10* (2022.01)

(58) Field of Classification Search
CPC .......... G09B 19/04; G09B 5/02; G06V 10/40; G06V 40/28; G06V 20/41; G06V 30/10; G06N 5/02; G06Q 50/01; G06Q 50/10; G06Q 10/10; G10L 17/00; G10L 25/63; G10L 25/90
See application file for complete search history.

(56) References Cited

U.S. PATENT DOCUMENTS

| | | | | |
|---|---|---|---|---|
| 2004/0197750 | A1* | 10/2004 | Donaher | G09B 7/00 434/236 |
| 2018/0374376 | A1* | 12/2018 | Kay | G09B 7/04 |
| 2019/0198011 | A1* | 6/2019 | Kerr | G10L 13/10 |
| 2021/0182659 | A1* | 6/2021 | Makhija | G06V 30/40 |

* cited by examiner

*Primary Examiner* — Timothy A Musselman
(74) *Attorney, Agent, or Firm* — Edmond A. DeFrank

(57) ABSTRACT

The embodiments disclose a method including using an on-demand roleplay network with internet connectivity to role playing study materials and real-time role playing sessions, connecting an on-demand roleplay application installed on role playing participant digital devices with the on-demand roleplay network to facilitate role playing partners real-time practice sessions, incorporating an artificial intelligence communicator coach analyzer with the on-demand roleplay network to provide role playing participants with nonverbal communication analysis and coaching, and providing role playing participants with a means to rate live practice sessions including the nonverbal communication skills.

20 Claims, 10 Drawing Sheets

METHOD AND DEVICES FOR ON-DEMAND ROLE PLAYING

BACKGROUND

Most people have heard the expression "practice makes perfect". Unfortunately they tend to think of that phrase as applying to physical activities including learning to play the piano, or pitching a baseball. While most people are not playing a piano daily or pitching a baseball daily the one thing they are doing daily is communicating with others. The mistake is the perception that communicating is simply opening your mouth and uttering words. The actual words we speak are only a part of communicating. How we speak, gesture, the tone of our voice, eye contact, our posture when speaking and listening to others are forms of nonverbal communication. Nonverbal communication makes up 93% of our communication and yet most people do not study those skills or practice those skills to gain perfection in communicating.

DETAILED DESCRIPTION OF THE INVENTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

General Overview

It should be noted that the descriptions that follow, for example, in terms of a method and devices for on-demand role playing is described for illustrative purposes and the underlying system can apply to any number and multiple types of conversations. In one embodiment of the present invention, the method and devices for on-demand role playing can be configured using an on-demand roleplay application. The method and devices for on-demand role playing can be configured to include real estate transaction presentations and can be configured to include an artificial intelligence communication coaching and analysis using the present invention.

Figure 1:
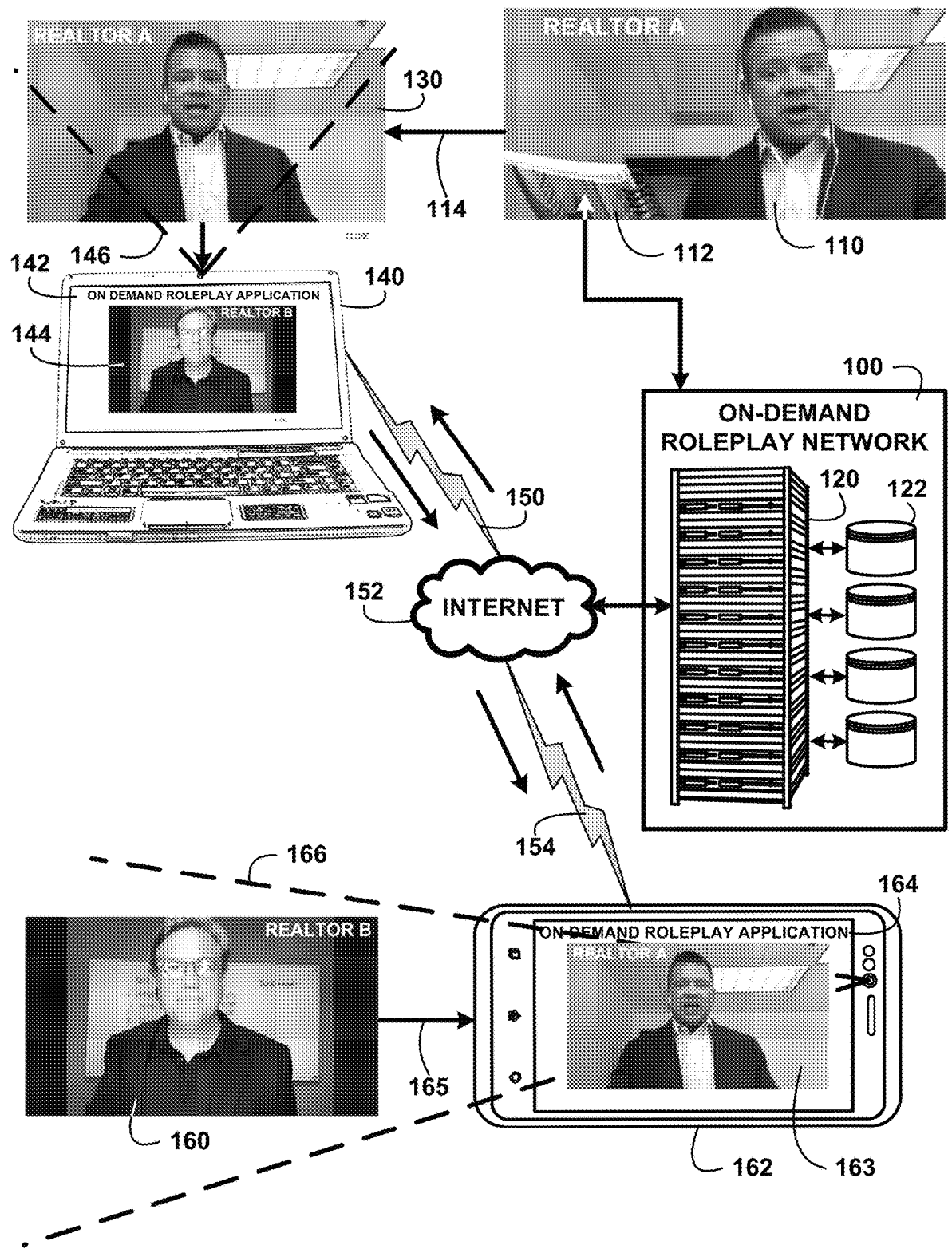
FIG. 1 shows for illustrative purposes only an example of an overview of an on-demand roleplay network of one embodiment.

FIG. 1 shows for illustrative purposes only an example of an overview of an on-demand roleplay network of one embodiment. FIG. 1 shows an on-demand roleplay network 100 including a digital server 120, a plurality of databases 122 and connections to the internet 152. Internet connectivity to Realtor A computer 150 allows Realtor A 110 to practice on a roleplay script 112 to practice a Realtor A presentation 130 to a client. A Realtor A practice broadcast 114 is transmitted using a Realtor A computer camera captured image 146. The Realtor A computer captured image of Realtor B 140 is displayed using an on-demand roleplay application installed on a computer 142. A Realtor B image displayed playing the client role 144 is transmitted using internet connectivity to Relator B smart phone 154. The Realtor B smart phone 162 includes an on-demand roleplay application installed on the smart phone 164. The on-demand roleplay application installed on the smart phone 164 shows a Realtor A image display making the presentation 163. The Realtor B smart phone camera image captured 166 of Realtor B 160 is seen by Realtor A from the Realtor B smart phone camera image transmitted 165 during the roleplay session of one embodiment.

DETAILED DESCRIPTION

Figure 2:
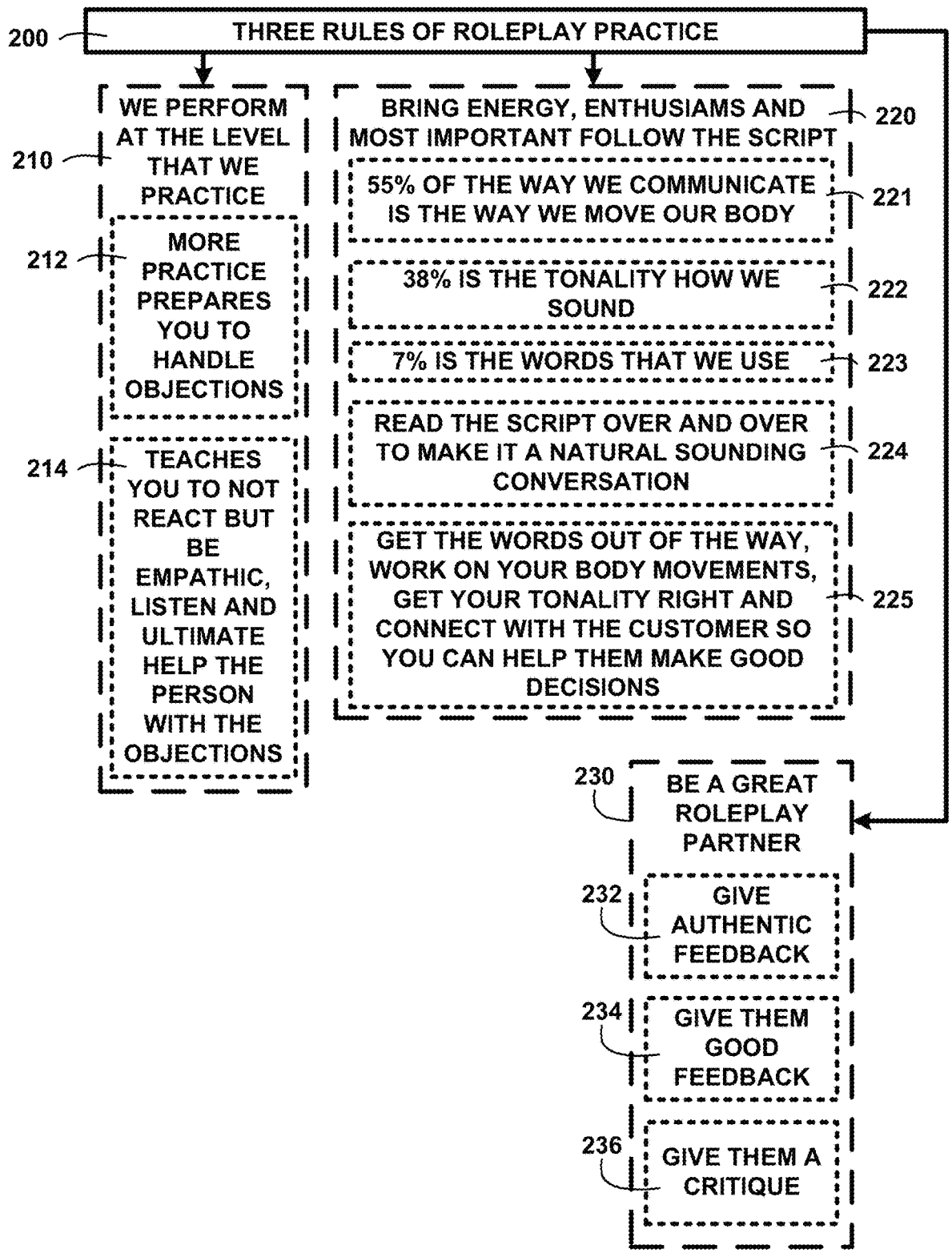
FIG. 2 shows for illustrative purposes only an example of three rules of roleplay practice of one embodiment.

FIG. 2 shows for illustrative purposes only an example of three rules of roleplay practice of one embodiment. FIG. 2 shows three rules of roleplay practice 200. The first rule of roleplay practice is we perform at the level that we practice 210. More practice prepares you to handle objections 212, and teaches you to not react but be empathic, listen and ultimate help the person with the objections 214. The second rule of roleplay practice is to bring energy, enthusiasm and most important follow the script 220. 55% of the way we communicate is the way we move our body 221. 38% is the tonality how we sound 222 and 7% is the words that we use 223. Read the script over and over to make it a natural sounding conversation 224. Get the words out of the way, work on your body movements, get your tonality right and connect with the customer so you can help them make good decisions 225. The third rule of roleplay practice is to be a great roleplay partner 230. A great roleplay partner will give authentic feedback 232, give them good feedback 234 and give them a critique 236 that is honest of one embodiment.

Figure 3:
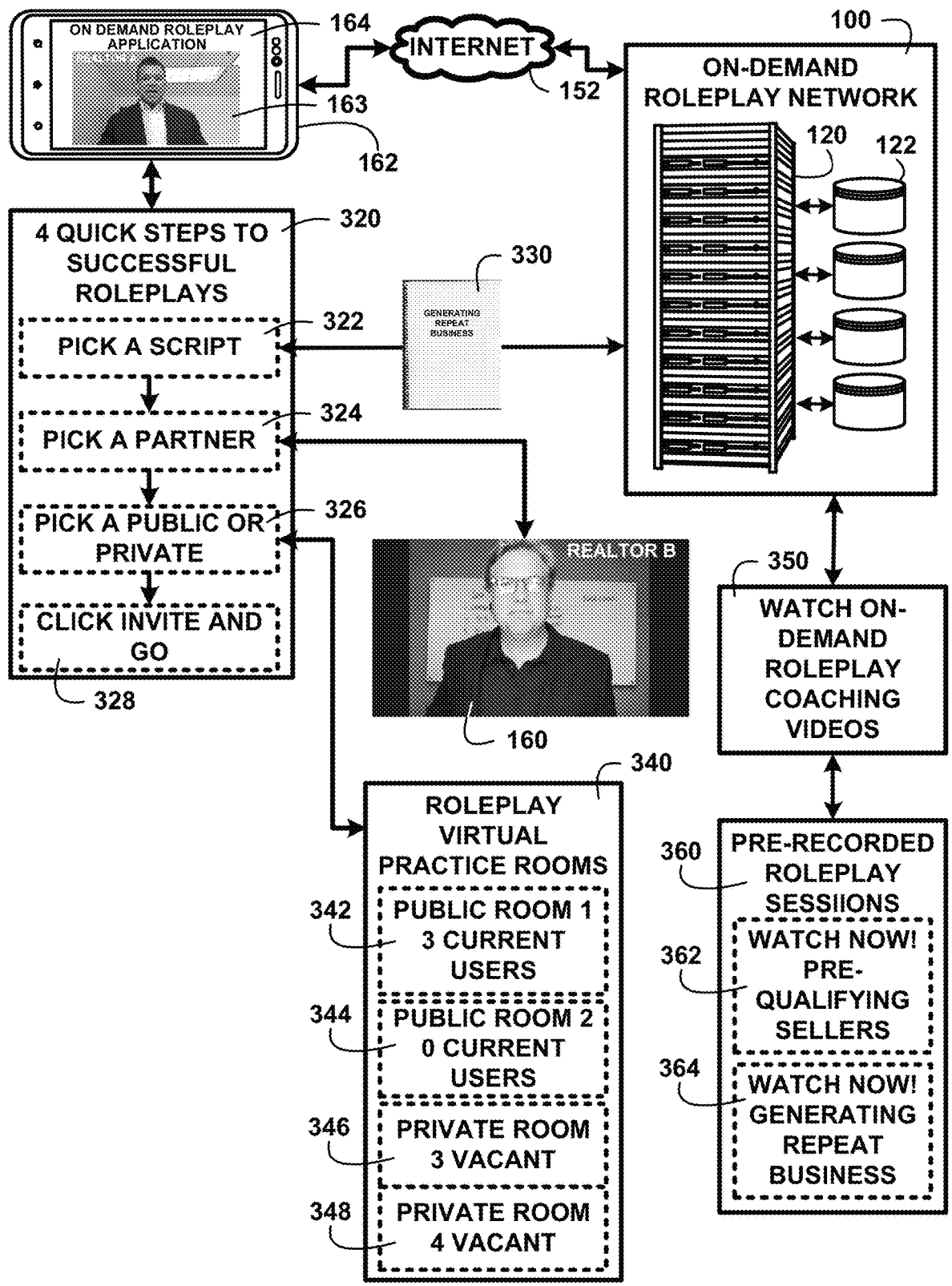
FIG. 3 shows for illustrative purposes only an example of 4 quick steps to successful roleplays of one embodiment.

4 Quick Steps to Successful Roleplays:

FIG. 3 shows for illustrative purposes only an example of 4 quick steps to successful roleplays of one embodiment. FIG. 3 shows the on-demand roleplay network 100, digital server 120, plurality of databases 122 and connection to the internet 152. An on-demand roleplay application installed on a smart phone 164 allows a Realtor A image display making the presentation 163 on the Realtor B smart phone 162. The method and devices for on-demand role playing includes 4 quick steps to successful roleplays 320. The first step is pick a script 322. In this example Realtor A has selected the script for generating repeat business 330. The second step is pick a partner 324 in this example Realtor A picked Realtor B 160. The third step is to pick a public or private 326 room on the demand roleplay network 100 from the roleplay virtual practice rooms 340. In this example the public or private 326 room availability is public room 1 3 current users 342, public room 2 0 current users 344, private room 3 vacant 346 and private room 4 vacant 348. The fourth quick step is to click invite and go 328.

In another embodiment a role player may watch on-demand roleplay coaching videos 350 of pre-recorded roleplay sessions 360. Pre-recorded roleplay sessions 360 for example may include "Watch now! Pre-qualifying sellers" 362 and "Watch now! Generating repeat business" 364 of one embodiment.

Figure 4:
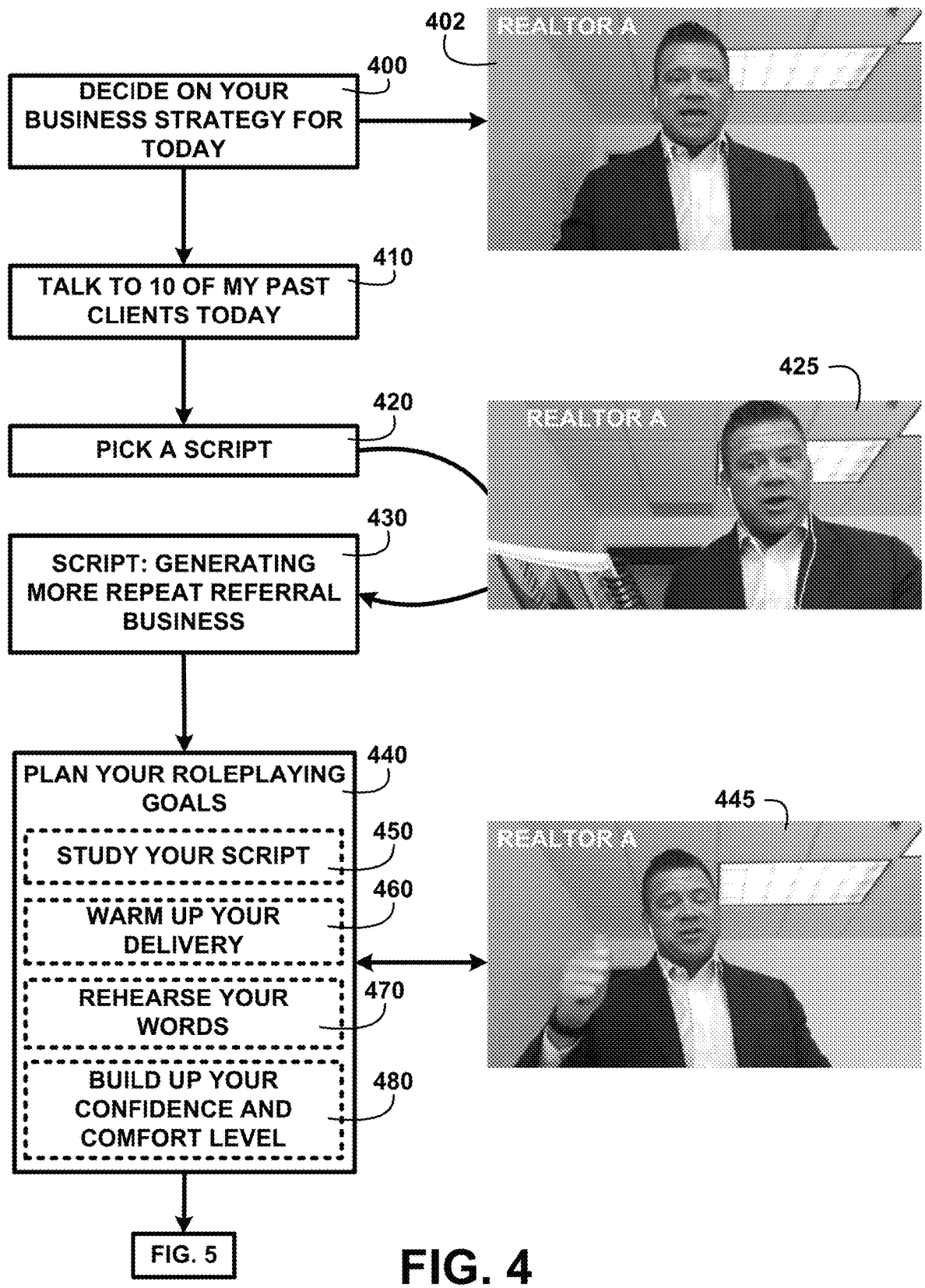
FIG. 4 shows for illustrative purposes only an example of deciding on your business strategy for today of one embodiment.

Deciding on Your Business Strategy for Today:

FIG. 4 shows for illustrative purposes only an example of deciding on your business strategy for today of one embodiment. FIG. 4 shows an example of a roleplay participant preparation for a roleplaying session. A participant should decide on your business strategy for today 400. In this example Realtor A is deciding on a business strategy for today 402 to talk to 10 of my past clients today 410. Next pick a script 420. Realtor A is picking a script 425 and selects a script: generating more repeat referral business 430.

The preparation continues plan your roleplaying goals 440, study your script 450, and warm up your delivery 460. Realtor A warming up his delivery 445 with rehearse your words 470. These preparations build up your confidence and comfort level 480. The preparation continues in FIG. 5 of one embodiment.

Figure 5:
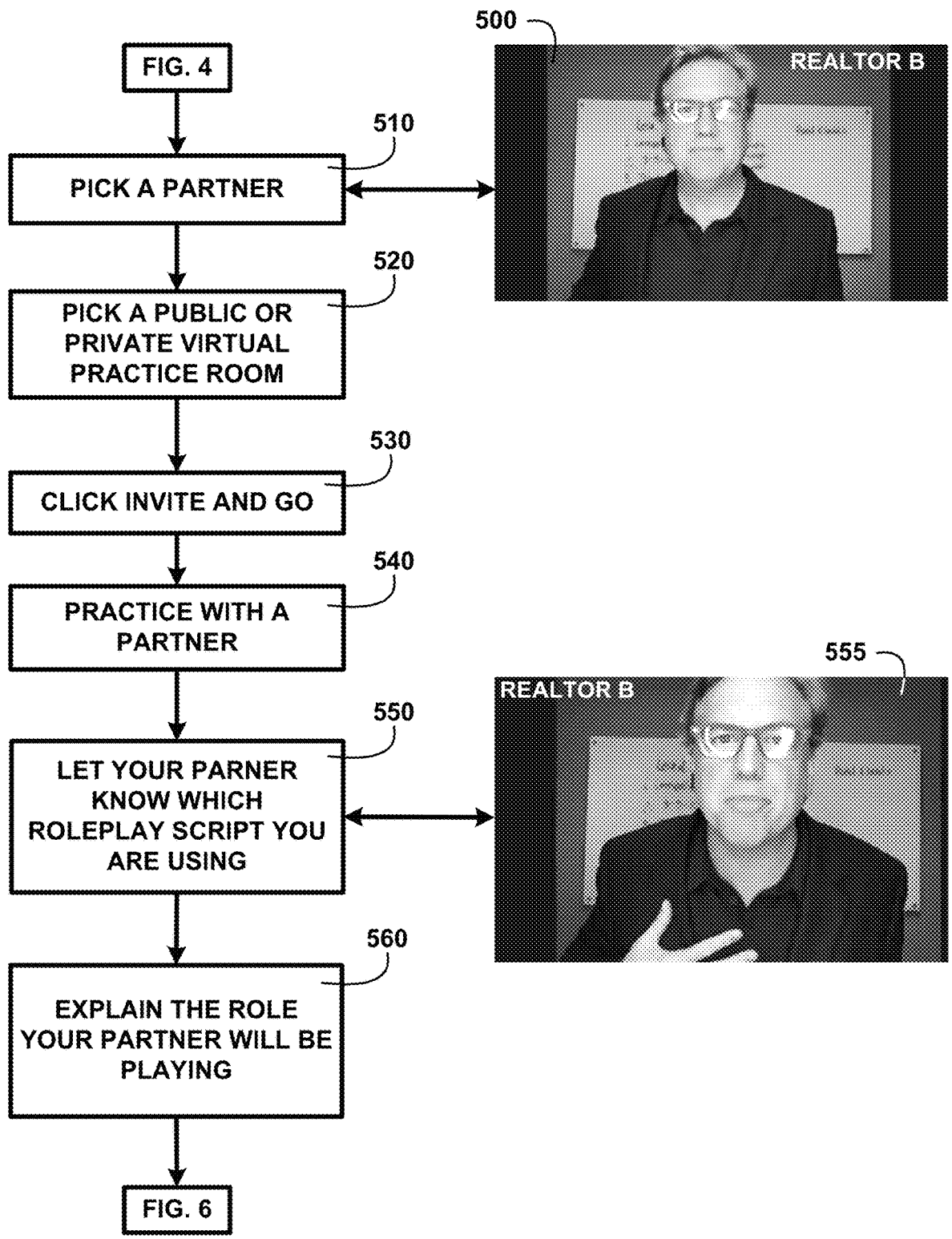
FIG. 5 shows for illustrative purposes only an example of picking a roleplaying partner of one embodiment.

Picking a Roleplaying Partner:

FIG. 5 shows for illustrative purposes only an example of picking a roleplaying partner of one embodiment. FIG. 5 shows a continuation from FIG. 4 where the preparation includes pick a partner 510. Realtor B is picked as a role play partner 500. Pick a public or private virtual practice room 520 then click invite and go 530. Then practice with a partner 540. Let your partner know which roleplay script you are using 550. Realtor B understands which script will be practiced 555. Be sure to explain the role your partner will be playing 560. Roleplaying practice is further described in FIG. 6 of one embodiment.

Figure 6:
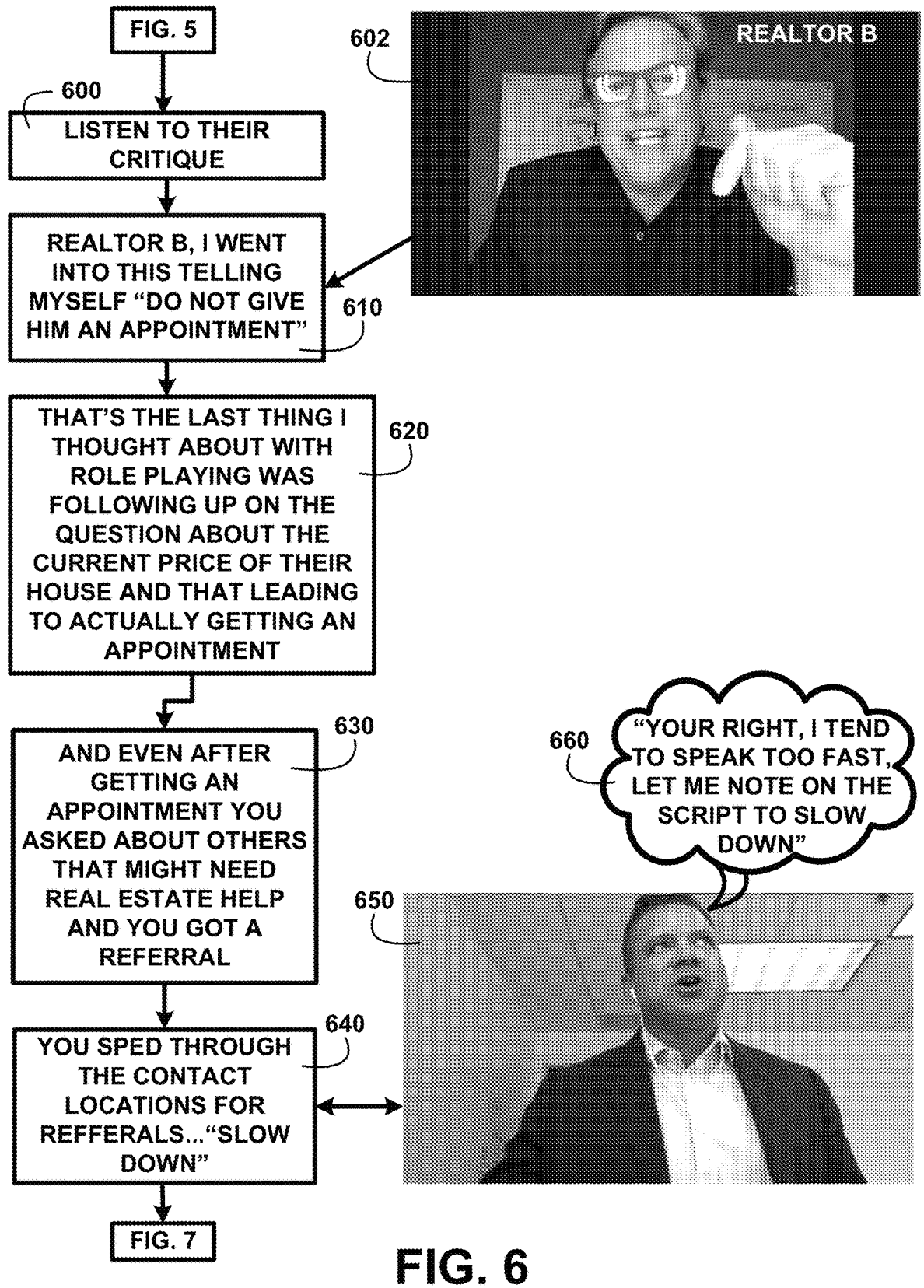
FIG. 6 shows for illustrative purposes only an example of listening to roleplaying partner critiques of one embodiment.

Listening to Roleplaying Partner Critiques:

FIG. 6 shows for illustrative purposes only an example of listening to roleplaying partner critiques of one embodiment. FIG. 6 shows a continuation from FIG. 5. Remember a great roleplay partner will give authentic feedback 232 of FIG. 2, give them good feedback 234 of FIG. 2 and give them a critique 236 of FIG. 2 that is honest. Listen to their critique 600 is will explain you strengths and your weaknesses that may need more roleplaying practice. FIG. 6 shows Realtor B explaining his critique 602. Realtor B, I went into this telling myself "do not give him an appointment" 610. That's the last thing I thought about with role playing was following up on the question about the current price of their house and that leading to actually getting an appointment 620. And even after getting an appointment you asked about others that might need real estate help and you got a referral 630. You sped through the contact locations for referrals . . . "slow down" 640.

Figure 7:
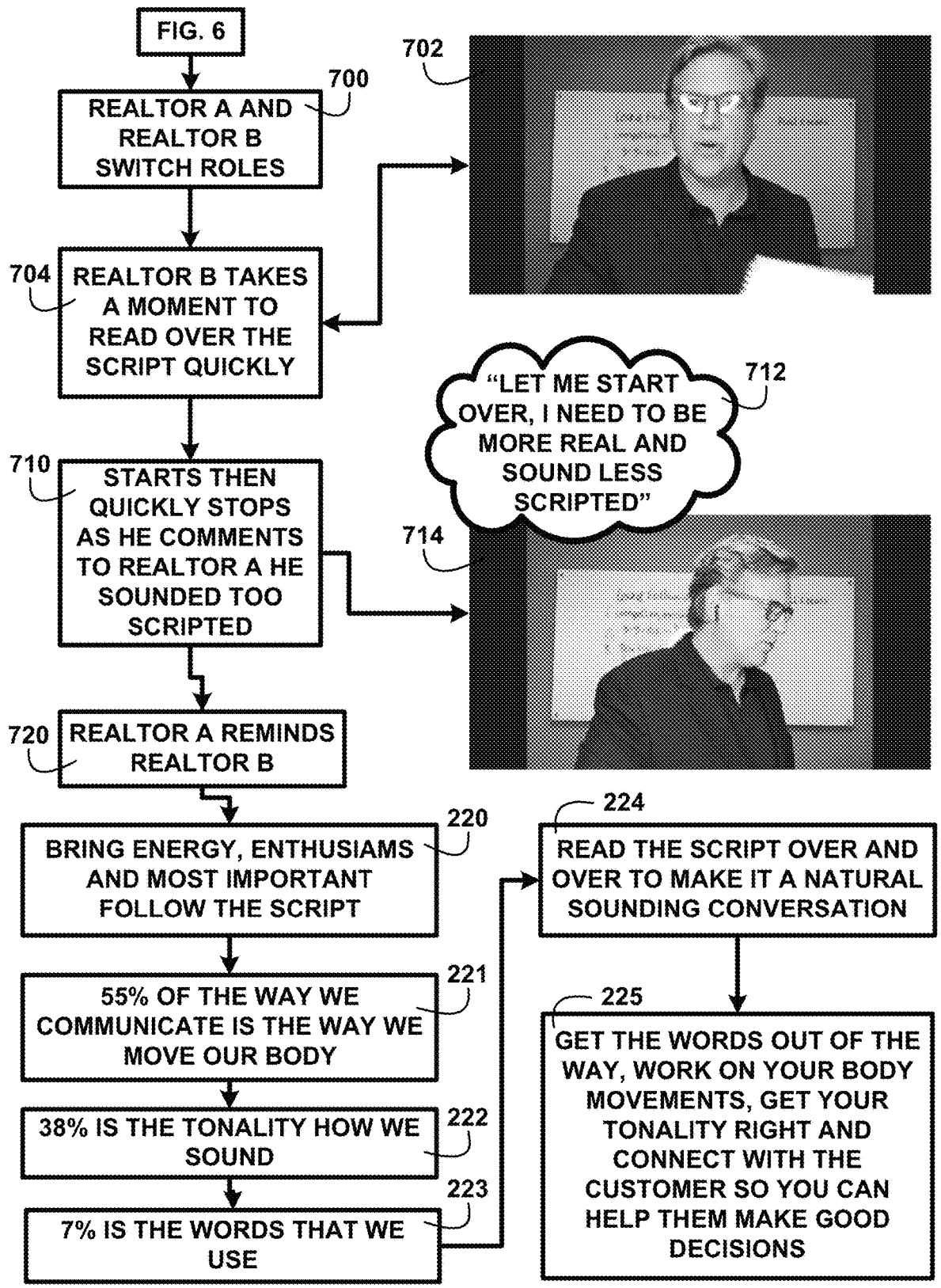
FIG. 7 shows for illustrative purposes only an example of Realtor A and Realtor B switching roles of one embodiment.

Realtor A commenting on role play partner's critique 650: "your right, I tend to speak too fast, let me note on the script to slow down" 660. FIG. 7 describes how one role playing session can become two sessions of one embodiment.

Realtor a and Realtor B Switch Roles:

FIG. 7 shows for illustrative purposes only an example of Realtor A and Realtor B switching roles of one embodiment. FIG. 7 shows continuing from FIG. 6 that Realtor A and Realtor B switch roles 700. Realtor B takes a moment to read over the script quickly 704. Realtor B reviews the script in the new switched role 702. Realtor B starts then quickly stops as he comments to Realtor A he sounded too scripted 710. Realtor B rechecks the script 714 and remarks "let me start over, I need to be more real and sound less scripted" 712. Realtor A reminds Realtor B 720 about the second rule of roleplay practice: bring energy, enthusiasm and most important follow the script 220. Further reminders that 55% of the way we communicate is the way we move our body 221, 38% is the tonality how we sound 222, and 7% is the words that we use 223. Remember to read the script over and over to make it a natural sounding conversation 224. Get the words out of the way, work on your body movements, get your tonality right and connect with the customer so you can help them make good decisions 225 of one embodiment.

Figure 8:
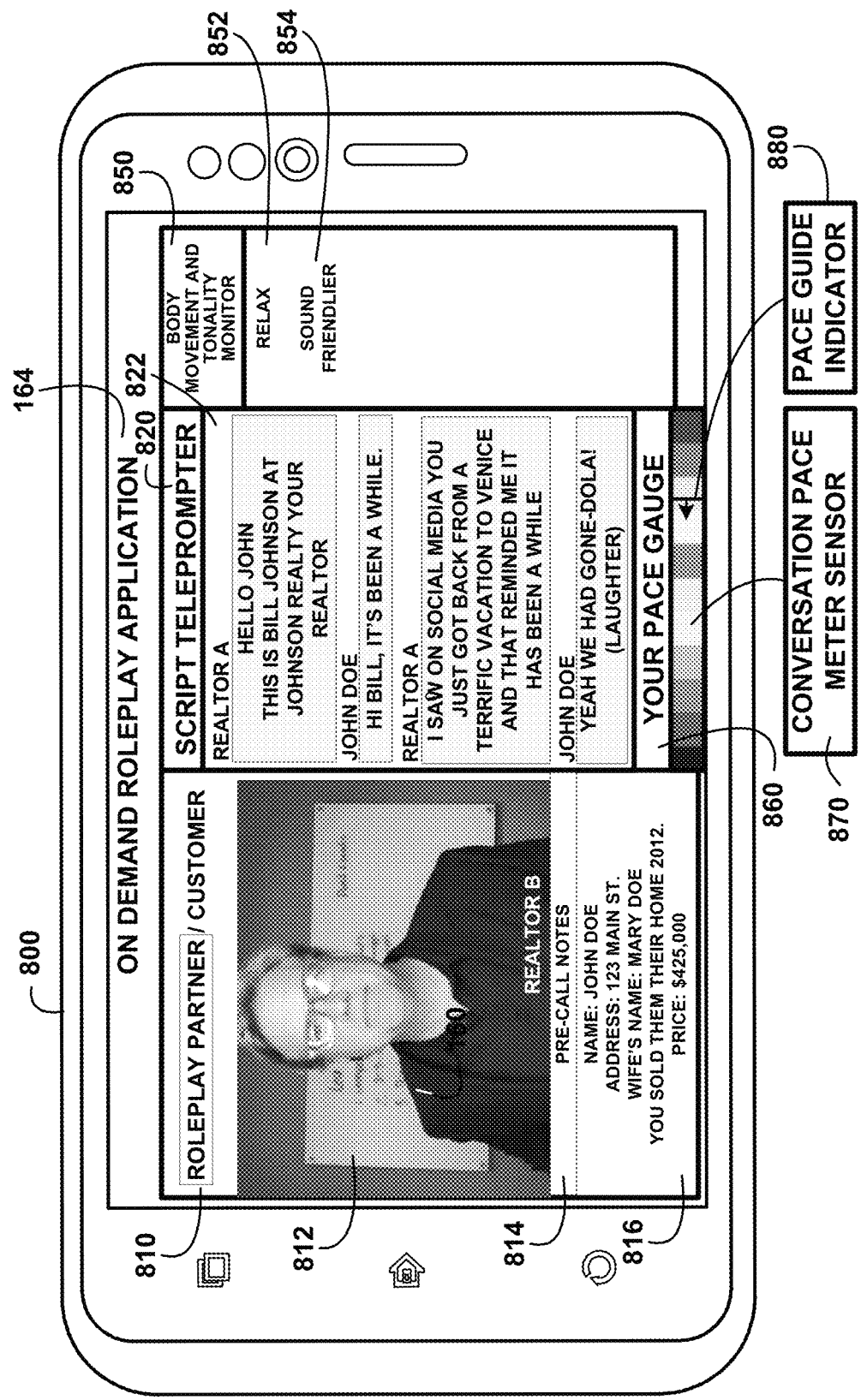
FIG. 8 shows for illustrative purposes only an example of an on-demand roleplay application of one embodiment.

On-Demand Role-Play Application:

FIG. 8 shows for illustrative purposes only an example of an on-demand roleplay application of one embodiment. FIG. 8 shows a Realtor A smart phone 800 with an on-demand roleplay application 164. The on-demand roleplay application 164 provides the role player when practicing and in real communication with a client some tools to reduce the stress and anxiety and critique their performance in real-time. In this example Realtor A can select whether they are communicating with a roleplay partner/customer 810. An image is displayed of Realtor B roleplay partner/customer 812 or a real customer from there smart phone camera image. The on-demand roleplay network 100 of FIG. 1 can load in pre-call notes 814 including for example name: John Doe 816, address: 123 Main St., wife's name: Mary Doe, you sold them their home 2012 and price: $425,000.

The on-demand roleplay application 164 includes a script teleprompter 820 to scroll through an electronic format of the script from the plurality of databases 122 of FIG. 1. The script teleprompter 820 displays the Realtor B sections and using voice recognition identifies the other person speaking and transcribes their comments. In this example Realtor A 822 opens with "Hello John this is Bill Johnson at Johnson Realty your realtor". John Doe responds "Hi Bill, it's been a while." Realtor A "I saw on social media you just got back from a terrific vacation to Venice and that reminded me it has been a while". John Doe replies "Yeah we had gone-dola! (laughter)".

The on-demand roleplay application 164 includes your pace gauge 860 with a conversation pace meter sensor 870 and pace guide indicator 880 to keep from talking too fast or slow. Also included is a body movement and tonality monitor 850. The on-demand roleplay application 164 reports the results of an analysis of your nonverbal communication results with suggestions to relax 852 and sound friendlier 854 of one embodiment.

Figure 9:
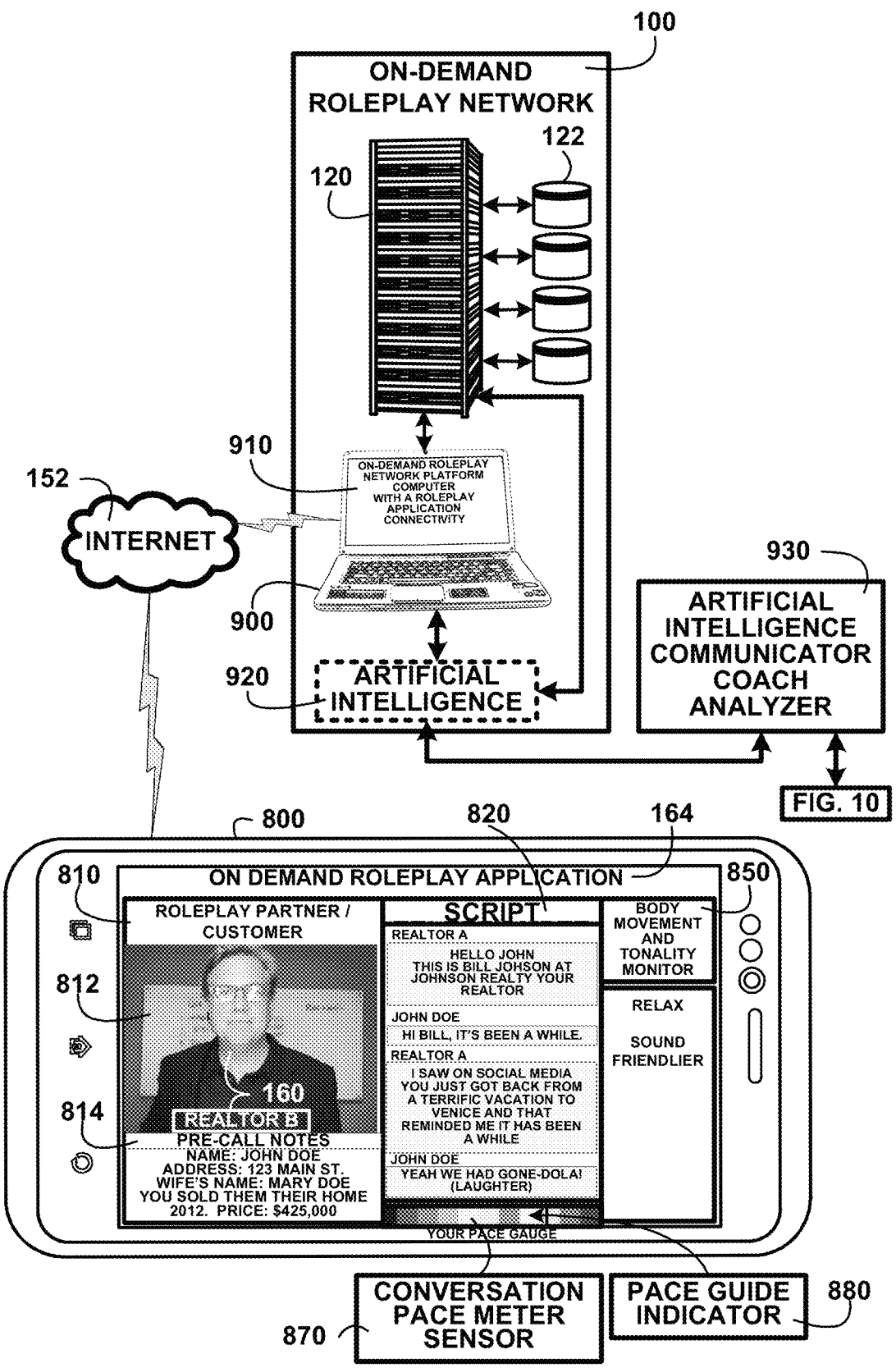
FIG. 9 shows for illustrative purposes only an example of an artificial intelligence communicator coach analyzer of one embodiment.

Artificial Intelligence Communicator Coach Analyzer:

FIG. 9 shows for illustrative purposes only an example of an artificial intelligence communicator coach analyzer of one embodiment. FIG. 9 shows the on-demand roleplay network 100, digital server 120, plurality of databases 122, connection to the internet 152 and an on-demand roleplay network platform computer 900. The on-demand roleplay network platform computer with roleplay application connectivity 910 may be used to report results from the on-demand roleplay network 100 artificial intelligence 920 modules that includes an artificial intelligence communicator coach analyzer 930. The interaction of the artificial intelligence communicator coach analyzer 930 is further described in FIG. 10. The artificial intelligence communicator coach analyzer 930 monitors, analyzes and reports back to for example the Realtor A smart phone 800 using the on-demand roleplay application 164. The features pf the on-demand roleplay application 164 include the roleplay partner/customer 810 selector, display, pre-call notes 814, script teleprompter 820, your pace gauge 860, conversation pace meter sensor 870, pace guide indicator 880, and body movement and tonality monitor 850 of one embodiment.

Figure 10:
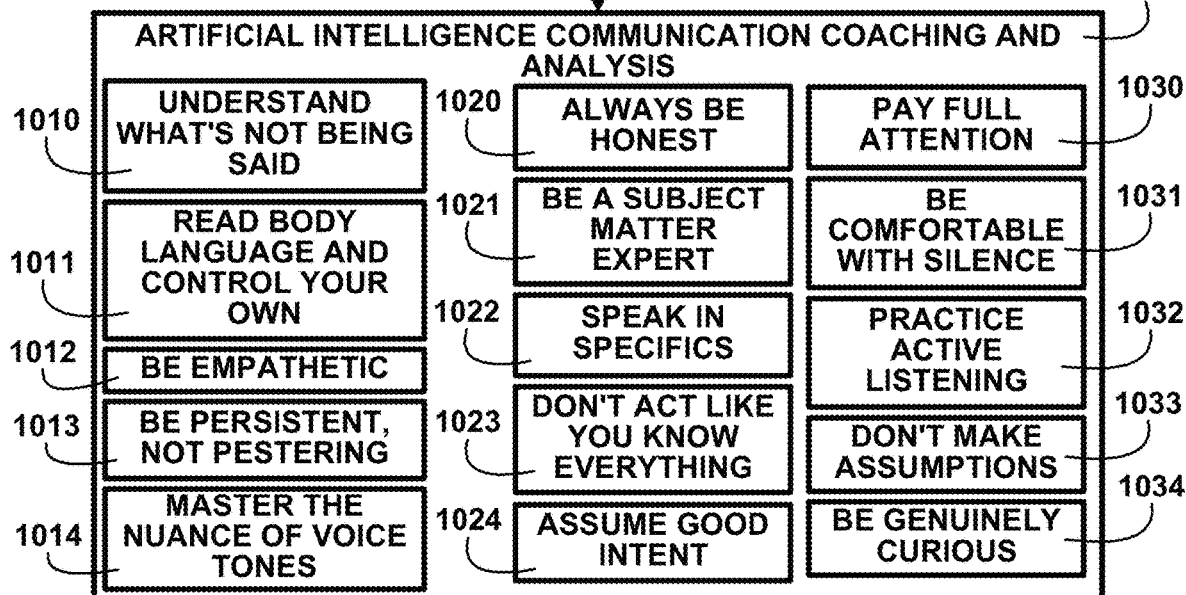
FIG. 10 shows for illustrative purposes only an example of artificial intelligence communication coaching and analysis of one embodiment.
Figure 10:
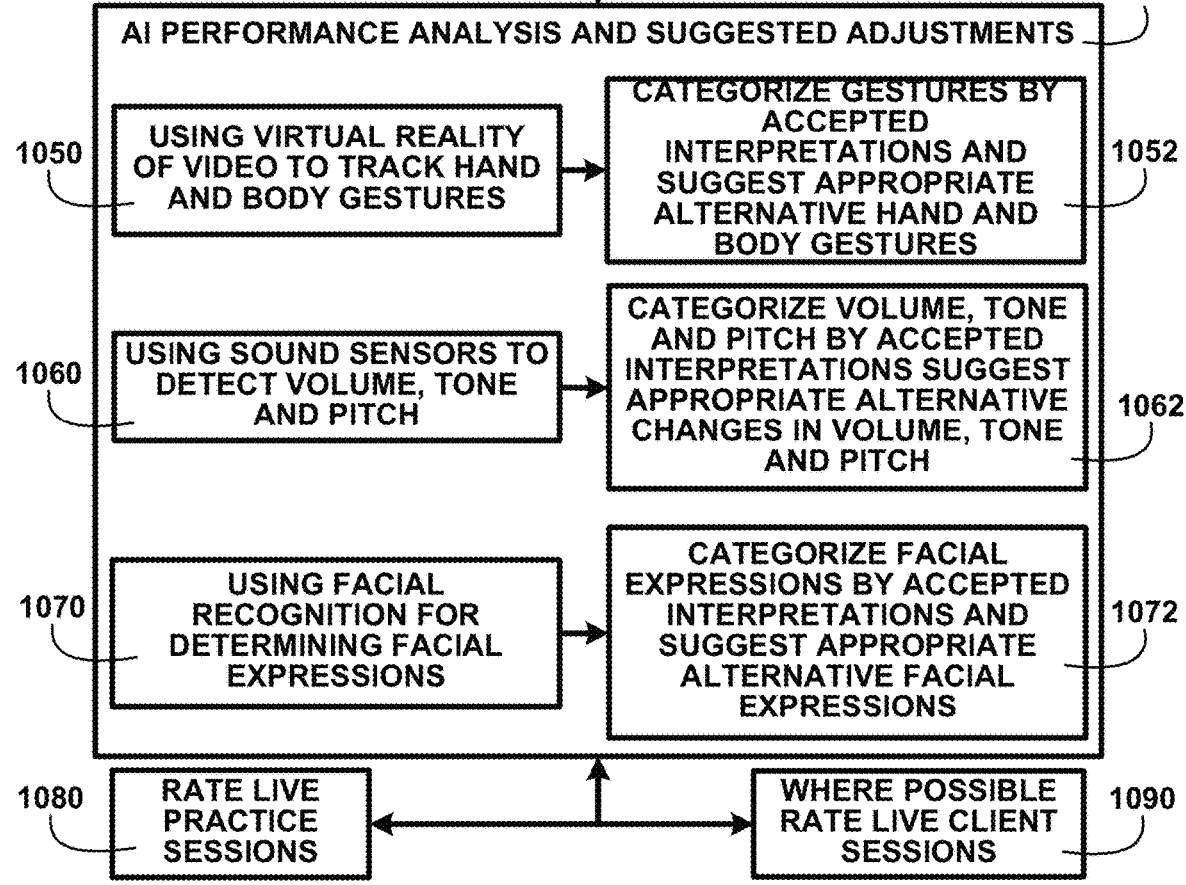

Artificial Intelligence Communication Coaching and Analysis:

FIG. 10 shows for illustrative purposes only an example of artificial intelligence communication coaching and analysis of one embodiment. FIG. 10 shows the method and devices for on-demand role playing artificial intelligence communication coaching and analysis 1000. The artificial intelligence communication coaching and analysis 1000 includes role playing criteria for example understand what's not being said 1010, read body language and control your own 1011, be empathetic 1012, be persistent, not pestering 1013, master the nuance of voice tones 1014, always be honest 1020, be a subject matter expert 1021, speak in specifics 1022, don't act like you know everything 1023, assume good intent 1024, pay full attention 1030, be comfortable with silence 1031, practice active listening 1032, don't make assumptions 1033, and be genuinely curious 1034.

The on-demand roleplay network 100 of FIG. 1 using the artificial intelligence 920 of FIG. 9 module automatically performs search and gather the best available information of non-verbal communication interpretations and records that data in the plurality of databases 122 of FIG. 1. AI performance analysis and suggested adjustments 1040 using virtual reality of video to track hand and body gestures 1050. Based on the tracking it will categorize gestures by accepted interpretations and suggest appropriate alternative hand and body gestures 1052 to the role player. Using sound sensors to detect volume, tone and pitch 1060 the AI performance analysis and suggested adjustments 1040 will categorize volume, tone and pitch by accepted interpretations suggest appropriate alternative changes in volume, tone and pitch 1062. The AI performance analysis and suggested adjustments will categorize facial expressions by accepted interpretations and suggest appropriate alternative facial expressions 1072 using facial recognition for determining facial expressions 1070.

The AI performance analysis will also provide role playing participants with a means to rate live practice sessions 1080 including the nonverbal communication and where possible rate live client sessions 1090 also. These features will provide nonverbal communication skill coaching to the role playing participants during practice to use with real customers. Improving the breadth of the practice sessions to include the 97% of the nonverbal communication components will allow the participants to put real value in the phrase practice makes perfect.

The foregoing has described the principles, embodiments and modes of operation of the present invention. However, the invention should not be construed as being limited to the particular embodiments discussed. The above described embodiments should be regarded as illustrative rather than restrictive, and it should be appreciated that variations may be made in those embodiments by workers skilled in the art without departing from the scope of the present invention as defined by the following claims.

What is claimed is:

1. A method, comprising:
   using an on-demand roleplay network with internet connectivity to role playing study materials and real-time on-demand role playing sessions;
   connecting an on-demand roleplay application installed on a digital device for use by a role playing participant with the on-demand roleplay network to facilitate role playing partners real-time on-demand practice sessions;
   pacing speech of the role playing participant using a pace gauge with a conversation pace meter sensor and pace guide indicator that compares a current speech pace of the role playing participant with a predetermined preferred speech pace expected by the role playing participant;
   displaying an image of a third party having a predetermined profile, wherein simulated responses of the third party based on the predetermined profile are displayed to the role playing participant during the real-time on-demand role playing sessions;
   measuring voice tones and body movements with a body movement and tonality monitor for comparing current voice tones and body movements of the role playing participant with a predetermined preferred voice tones and body movements expected by the role playing participant;
   incorporating an artificial intelligence communicator coach analyzer with the on-demand roleplay network to provide role playing participants with nonverbal communication analysis and coaching; and
   providing role playing participants with a means to rate live practice sessions including the nonverbal communication skills.

2. The method of claim 1, further comprising the on-demand roleplay network is configured for displaying three rules of roleplay practice, including a first rule of roleplay practice is we perform at the level that we practice, a second rule of roleplay practice is to bring energy, enthusiasm and most important follow the script and a third rule of roleplay practice is to be a great roleplay partner.

3. The method of claim 1, further comprising the on-demand roleplay network is configured for displaying 4 quick steps to successful roleplays including a first step is pick a script, a second step is pick a partner, a third step is to pick a public or private room on the demand roleplay network, and a fourth quick step is to click invite and go.

4. The method of claim 1, further comprising the on-demand roleplay network is configure to include a digital server, a plurality of databases, and connection to the internet for gathering, recording, storing and retrieving role playing materials, coaching suggestions and replaying pre-recorded role playing practice sessions on demand.

5. The method of claim 1, further comprising the on-demand roleplay application is configured to include a script teleprompter for scrolling through an electronic format of the script from the plurality of databases, and wherein the script teleprompter using voice recognition identifies persons speaking and transcribes their comments.

6. The method of claim 1, further comprising the on-demand roleplay network is configured for loading pre-call notes into the on-demand roleplay application installed on role playing participant digital devices.

7. The method of claim 1, further comprising the on-demand roleplay application is configured to includes a pace gauge with a conversation pace meter sensor and pace guide indicator for assisting a role playing participant is maintaining a suitable speaking pace.

8. The method of claim 1, further comprising the on-demand roleplay application is configured to include a body movement and tonality monitor for reporting results of an artificial intelligence analyzer analysis of a role playing participant's nonverbal communication results and providing suggestions to improve.

9. The method of claim 1, further comprising the on-demand roleplay application is configured to include a roleplay partner/customer selector for selecting whether this is a practice session or customer session.

10. The method of claim 1, further comprising the on-demand roleplay network is configured for using an artificial intelligence module for automatically performing searches and gathering the best available information of non-verbal communication interpretations and recording that data in a plurality of databases.

11. An apparatus, comprising:
  an on-demand roleplay network with internet connectivity configured for conducting real-time on-demand role playing practice sessions for Realtors;
  an on-demand roleplay application configured for installing on digital devices of a role playing participant for conducting real-time on-demand role playing practice sessions;
  a pace gauge with a conversation pace meter sensor and pace guide indicator configured to pace speech of the role playing participant with a pace gauge that compares a current speech pace of the role playing participant with a predetermined preferred speech pace expected by the role playing participant;
  an image of a third party having a predetermined profile configured to simulate responses of the third party based on the predetermined profile that are displayed to the role playing participant during the real-time on-demand role playing sessions;
  a body movement and tonality monitor configured to monitor voice tones and body movements for comparing current voice tones and body movements of the role playing participant with a predetermined preferred voice tones and body movements expected by the role playing participant;
  an artificial intelligence module for gathering non-verbal communication interpretations and recording that data in a plurality of databases;
  an artificial intelligence communicator coach analyzer configured for analyzing role playing participant non-verbal communication input and reporting accepted interpretations and making suggested changes to the role playing participant; and
  a digital processor and OCR device are configured for converting printed role playing scripts into an electronic format for use on an on-demand roleplay application teleprompter.

12. The apparatus of claim 11, further comprising the on-demand roleplay network with internet connectivity configured to include a digital server, a plurality of databases, a computer and connections to the internet.

13. The apparatus of claim 11, further comprising the artificial intelligence communicator coach analyzer configured for analyzing virtual reality of video to track hand and body gestures and categorizing gestures by accepted interpretations and suggesting appropriate alternative hand and body gestures to a role playing participant.

14. The apparatus of claim 11, further comprising the artificial intelligence communicator coach analyzer configured for analyzing data from sound sensors detecting volume, tone and pitch of a role playing participant and categorizing the volume, tone and pitch by accepted interpretations and suggesting appropriate alternative changes in volume, tone and pitch for the role playing participant.

15. The apparatus of claim 11, further comprising the on-demand roleplay application is configured to include an electronic teleprompter on a role playing participant's digital device and using voice recognition to identify each person speaking and transcribing the conversation.

16. An apparatus, comprising:
  a digital server, a plurality of databases, a computer and connections to the internet forming an on-demand roleplay network;
  a pace gauge with a conversation pace meter sensor and pace guide indicator configured to pace speech of a role playing participant with a pace gauge that compares a current speech pace of the role playing participant with a predetermined preferred speech pace expected by the role playing participant;
  an image of a third party having a predetermined profile configured to simulate responses of the third party based on the predetermined profile that are displayed to the role playing participant during real-time on-demand role playing sessions;
  a body movement and tonality monitor configured to monitor voice tones and body movements for comparing current voice tones and body movements of the role playing participant with a predetermined preferred voice tones and body movements expected by the role playing participant; and
  an artificial intelligence communicator coach analyzer configured for analyzing role playing participants non-verbal communication skills and reporting the analysis to the role playing participant.

17. The apparatus of claim 16, wherein the plurality of databases is configured for recording role playing scripts in electronic text for use with a digital teleprompter of the on-demand roleplay application.

18. The apparatus of claim 16, wherein the on-demand roleplay network is configured for displaying three rules of roleplay practice and 4 quick steps to successful roleplays to role playing participants.

19. The apparatus of claim 16, further comprising the on-demand roleplay network is configured to include an artificial intelligence module for automatically searching and gathering the best available information of non-verbal communication interpretations and records that data in the plurality of databases.

20. The apparatus of claim 16, further comprising the on-demand roleplay network is configured to include an artificial intelligence communicator coach analyzer including sound sensors for detecting volume, tone and pitch of a role playing participant and recording virtual reality video and a body movement and tonality monitor for analyzing a role playing participant's nonverbal communication skills.

* * * * *